(12) United States Patent
Del Carmen Montano et al.

(10) Patent No.: US 10,310,158 B2
(45) Date of Patent: Jun. 4, 2019

(54) VEHICLE LIGHTING DEVICE WHEREIN A LIGHT GUIDE SUPPORTS ANOTHER LIGHT GUIDE

(71) Applicant: VALEO ILUMINACION, Martos (ES)

(72) Inventors: Maria Del Carmen Montano, Martos (ES); Manuel Fuentes, Martos (ES); Juan Manuel Martinez, Granada (ES)

(73) Assignee: VALEO ILUMINACION, Martos (ES)

( * ) Notice: Subject to any disclaimer, the term of this patent is extended or adjusted under 35 U.S.C. 154(b) by 0 days.

(21) Appl. No.: 15/541,086

(22) PCT Filed: Jan. 15, 2016

(86) PCT No.: PCT/EP2016/050806
§ 371 (c)(1),
(2) Date: Jun. 30, 2017

(87) PCT Pub. No.: WO2016/113405
PCT Pub. Date: Jul. 21, 2016

(65) Prior Publication Data
US 2018/0003878 A1    Jan. 4, 2018

(30) Foreign Application Priority Data
Jan. 15, 2015  (FR) ..................... 15 50302

(51) Int. Cl.
| B60Q 1/00 | (2006.01) |
| F21V 8/00 | (2006.01) |
| F21S 41/00 | (2018.01) |
| F21S 43/14 | (2018.01) |
| F21S 43/27 | (2018.01) |
| F21S 43/50 | (2018.01) |
| F21S 43/237 | (2018.01) |

(Continued)

(52) U.S. Cl.
CPC .......... *G02B 6/0008* (2013.01); *B60Q 1/0011* (2013.01); *F21S 41/00* (2018.01);

(Continued)

(58) Field of Classification Search
CPC ........ F21S 43/14; F21S 43/236; F21S 43/237; F21S 43/241; F21S 43/247; G02B 6/0008

(Continued)

(56) References Cited

U.S. PATENT DOCUMENTS

| 5,984,497 A | 11/1999 | Foerstner et al. |
| 6,874,921 B2 * | 4/2005 | Verlage .................. E05B 17/10 |
| | | 362/23.15 |

(Continued)

FOREIGN PATENT DOCUMENTS

| DE | 10 2004 047 653 A1 | 5/2005 |
| EP | 2 270 389 A1 | 1/2011 |
| FR | 2 995 971 A1 | 3/2014 |

OTHER PUBLICATIONS

International Search Report dated Mar. 15, 2016, in PCT/EP2016/050806 filed Jan. 15, 2016.

(Continued)

*Primary Examiner* — Alexander K Garlen
(74) *Attorney, Agent, or Firm* — Oblon, McClelland, Maier & Neustadt, L.L.P.

(57) ABSTRACT

The present invention relates to a vehicle lighting device including a first light guide and a second light guide each adapted to emit at least a part of a lighting function. The first light guide has a main light guide part, a fixing part fixing the main part to the second light guide and extending between the main part and the second guide so that one of the guides supports the other one in said lighting device.

20 Claims, 3 Drawing Sheets

(51) Int. Cl.
*F21S 43/241* (2018.01)
*F21S 43/243* (2018.01)
*F21S 43/245* (2018.01)
*F21S 43/247* (2018.01)
*F21W 107/10* (2018.01)
*F21Y 115/10* (2016.01)

(52) U.S. Cl.
CPC ............ *F21S 43/14* (2018.01); *F21S 43/237* (2018.01); *F21S 43/241* (2018.01); *F21S 43/243* (2018.01); *F21S 43/245* (2018.01); *F21S 43/247* (2018.01); *F21S 43/27* (2018.01); *F21S 43/50* (2018.01); *F21W 2107/10* (2018.01); *F21Y 2115/10* (2016.08)

(58) Field of Classification Search
USPC ......................................................... 362/511
See application file for complete search history.

(56) References Cited

U.S. PATENT DOCUMENTS

| | | | | |
|---|---|---|---|---|
| 8,764,257 | B2 * | 7/2014 | De Lamberterie | B60Q 1/2607 362/511 |
| 2007/0058383 | A1 * | 3/2007 | Gunther | B60Q 1/2665 362/494 |
| 2007/0292101 | A1 * | 12/2007 | Gomez Ruiz | G02B 6/0005 385/147 |
| 2011/0007518 | A1 | 1/2011 | De Lamberterie | |
| 2012/0069592 | A1 * | 3/2012 | Natsume | B60Q 1/0052 362/511 |
| 2012/0147617 | A1 * | 6/2012 | Fritz | B60Q 1/2665 362/511 |
| 2012/0250342 | A1 * | 10/2012 | Reuschel | B60K 37/00 362/488 |
| 2014/0160778 | A1 * | 6/2014 | Nakada | G02B 6/002 362/511 |
| 2014/0247617 | A1 | 9/2014 | De Lamberterie | |
| 2014/0340919 | A1 * | 11/2014 | Gebauer | F21S 41/322 362/511 |
| 2016/0053962 | A1 * | 2/2016 | Akutsu | B60Q 1/0052 362/511 |
| 2016/0146441 | A1 * | 5/2016 | Mochizuki | F21S 48/2281 315/77 |
| 2017/0219180 | A1 * | 8/2017 | Kovach | F21S 48/225 |

OTHER PUBLICATIONS

French Search Report dated Nov. 24, 2015, in French Application 1550302 filed Jan. 15, 2015.

* cited by examiner

VEHICLE LIGHTING DEVICE WHEREIN A LIGHT GUIDE SUPPORTS ANOTHER LIGHT GUIDE

The present invention relates to the field of motor vehicle lighting devices, in particular lighting devices comprising light guides.

The present invention relates in particular to a vehicle lighting device comprising two light guides fixed one to the other so that one of the guides supports the other one in said lighting device.

The document JP2012190761 discloses a vehicle lighting device in which an intermediate guide transmits a luminous flux along its length. That intermediate guide carries terminal guides and also comprises prisms for redirecting some rays from this flux inside these terminal guides.

However, the degrees of freedom for orienting the intermediate guide and the terminal guides are limited. Precise orientations have to be complied with for arranging the various terminal guides by fixing them to the main guide in order to be able to connect them. Moreover, it is disclosed that the angle of incidence of the terminal guides to the main guide must conform to a precise angle.

The technical problem addressed by the invention is therefore to find a light guide arrangement in which one carries the other one, enabling greater freedom of implementation of these guides, notably of their orientation relative to one another.

To this end, the invention consists firstly in a vehicle lighting device comprising a first light guide and a second light guide each adapted to emit at least a part of a lighting function, said two guides being two separate parts, said first light guide comprising:
- a main light guide part comprising an entry diopter intended to receive light rays from a light source and a main exit diopter, in particular in front of the entry diopter, the main guide part being such that a first portion of the light rays passing through the entry diopter are guided to the main exit diopter, and for example pass through it,
- a fixing part fixing said main part to the second light guide and extending between said main part and the second guide so that one of the guides supports the other one in said lighting device.

The second light guide therefore has more degrees of freedom relative to the fixing part of the first guide and therefore relative to the first guide itself. In particular, it is possible to orient the main guide part of the light guides parallel to one another.

The lighting device according to the invention may optionally have one or more of the following features:
- the fixing part is made in one piece with the main guide part; this enables a simpler implementation, the fixing part being already positioned relative to one of the guides;
- the fixing part of the first light guide and the second light guide are nested one in the other; this fixing is simple to execute, and in particular facilitates the molding of the fixings;
- a screw passes through the nested parts of said second light guide and the fixing part of the first light guide; this makes it possible to provide the fixing;
- the second light guide also comprises a main light guide part comprising an entry diopter intended to receive light rays from another light source and a main exit diopter, in particular in front of the entry diopter, the main guide part being such that a first portion of the light rays passing through the entry diopter are guided to the main output diopter, and for example pass through it; this allows more degrees of freedom because the second light guide can receive the light rays from a light source specifically dedicated to it; there is therefore no longer any need to conform to a particular orientation of the two light guides relative to each other so that light rays pass from the first light guide to the second guide;
- the second light guide also comprises a fixing part fixed to the first light guide;
- the fixing part of the second light guide is fixed to the fixing part of the first light guide; the degrees of freedom for fixing one guide to the other one are therefore the same as those for fixing these two fixing parts; in other words, the two guides can be oriented independently even though one of them carries the other one;
- the fixing part or parts comprise(s) a fixing means for fixing the corresponding fixing part;
- the fixing part of one light guide comprises a receiving lug or stud, the fixing part of the other light guide comprising a tenon or a stud adapted to nest in said receiving lug or stud; this is a simple way to produce fixing means by molding them;
- a fixing rod, in particular a screw or rivet, passes through both said receiving lug or said receiving stud and said tenon or said stud adapted to be nested;
- said fixing part for one or for each light guide is made in one piece with the guide comprising that fixing part;
- the fixing part or parts form secondary light guide parts, the main guide part and the fixing part of the first light guide and/or the second light guide being such that a second portion of the light rays passing through the entry diopter of the corresponding guide is guided inside the corresponding fixing part, the latter comprising coupling means arranged along a decoupling portion of said fixing part so that rays escape along the latter; this also makes it possible to use this fixing part to extend the lighting area of the lighting functions and/or for illuminating the lighting device;
- the fixing part or parts form at least one step between the decoupling portion and the fixing means of the same light guide; this step allows controlled leakage of the rays at the level of this step and makes it possible to choose where the rays will be able to leave it;
- an occulter is positioned in front of the fixing means of said light guide or guides so as to occult said fixing means for an observer external to said lighting device;
- the step and the occulter are such that the rays leaving at the level of the step and between the step and the fixing means are occulted by the occulter; this is particularly advantageous in the context of the invention, because the fixing is offset by a diffusing secondary part and the remaining rays reaching its end will be absorbed by this occulter;
- the main guide part of one or each light guide comprises a reflection portion adapted to reflect said second portion of the light rays toward and inside said secondary guide part of said guide; this is an embodiment for diverting a portion of the light rays into the secondary guide part;
- said reflection portion forms a constriction of the corresponding main guide parts of one or each guide so that it intercepts a portion of the light rays coming from the entry diopter; this facilitates the production of the reflection portion;

said main guide part of one or each guide comprises:
an upstream portion extending from the entry diopter to said reflection portion,
a downstream portion extending from said reflecting portion toward the main exit diopter, the downstream portion being thinner than the upstream portion;
this facilitates the production of the constriction;
the rear of the corresponding fixing part is joined to said upstream portion at an acute angle as seen from outside the guide and the front of this guiding fixing part is joined to said upstream portion by a curve the chord of which is at an obtuse angle to said downstream portion as seen from the outside of the lighting device;
the reflection portion is formed by an inclined plane;
the reflection portion faces said junction zone;
each fixing part is curved and as seen from the outside of the guide is concave at the front and convex at the rear;
the fixing parts form a circular arc;
it comprises an envelope formed by a casing and an outer lens to close the casing, one of the light guides being supported in the casing by the other light guide;
it comprises the light source or sources, notably one or more light-emitting diodes, adapted to emit light rays through the entry diopter or diopters;
a first light rays portion of each of said first and second light guides, on leaving the main exit diopter of the corresponding guide, form part or all of a signaling and/or road lighting function, notably a stop light, turn indicator and/or reversing light function;
the fixing part comprises decoupling means arranged along this secondary decoupling part so that rays escape along the latter, said rays forming a halo illuminating the interior of said envelope; this enables a night-time signature to be assigned making it possible to see the optical components and the mask or masks of the lighting device at night; this is particularly beneficial in embodiments in which the vehicle lighting device is a signaling device, such as a rear light, or a device for lighting the road, such as a headlight;
it comprises a mask partly covering the main guide part of the first light guide; the reflection portion of this guide can be such that its external surface forms an abutment on which said mask is positioned; this minimizes the number of particular portions to be molded, which makes it possible to simplify the molding of the parts, notably of the first light guide, but also the number of positioning operations to be carried out during the assembly of the vehicle lighting device;
in parallel with or instead of the above, the device may comprise a mask partly covering the main guide part of the second light guide; the reflection portion of this guide can be such that its external surface forms an abutment on which said mask is positioned;
said mask is or said masks are formed by a sleeve in which the corresponding main guide part is inserted; the first light guide and/or the second light guide therefore serve(s) also for the precise positioning of the mask(s); according to one embodiment, the mask or masks comprise(s) a complementary shape in contact with the external surface of the corresponding reflection portion; this is a simple way to position the mask or masks when they are inserted;
the sleeve or sleeves comprise(s) a counter-shape complementary to and in contact with the external surface of the corresponding reflection portion;
the vehicle lighting device is a signaling light, notably a vehicle rear light, a device for lighting the road, notably a headlight, or a device for lighting the interior of the passenger compartment of a vehicle, notably an overhead light or a wall light.

The invention further consists in a vehicle comprising a light guide and/or a lighting device according to the invention.

In the present application the terms "upstream" and "downstream" refer to the direction along a light guide part of the rays coming from the light source.

The terms "front" and "rear" refer to the direction of emission of light from the entry diopter of the main guide part to its main exit diopter.

Figure 1:
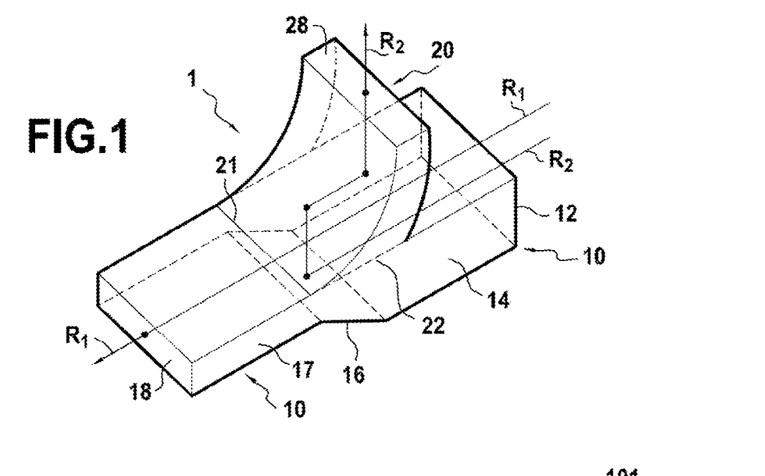
FIG. 1 represents a detail of FIG. 2.
Figure 2:
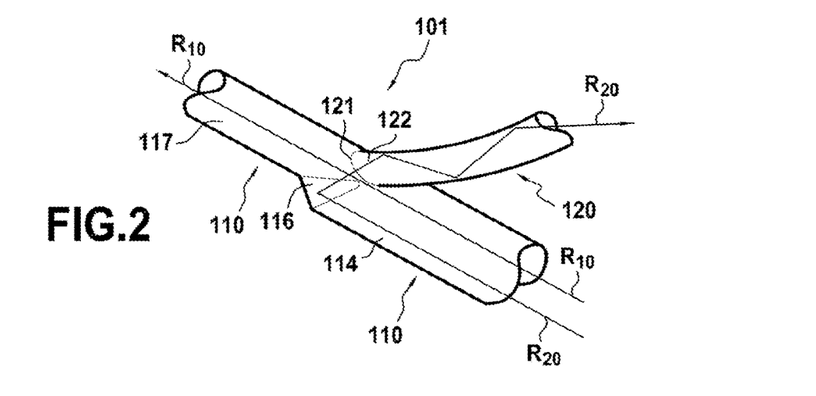
FIG. 2 represents a vehicle lighting device according to the invention.

Other features and advantages of the invention will become apparent on reading the following detailed description of nonlimiting embodiments, to understand which reference should be made to the appended drawings, in which:

FIGS. 1 and 2 show a vehicle lighting device 260 according to the invention.

That lighting device 260 comprises a casing 262 and a closure outer lens 264 that closes a front opening of the casing 262. The casing 262 and the closure outer lens 264 therefore delimit an envelope 261 of the lighting device 260. This closure outer lens 264 is made of a transparent material and can be made of polymer or glass.

A first light guide 201 is placed inside this envelope 261. As shown, it is supported in this casing 262 by a second light guide 201', the latter being fixed to the casing, notably to the upper wall of the casing.

Alternatively, the lighting device may be such that the second light guide 201' rests on the first light guide 201 and is therefore carried by the latter, this first light guide 201 being fixed to the lower wall of the casing 262, for example.

As shown in FIG. 1, according to a first embodiment of the invention the first light guide 201 comprises a main guide part 210 fixed by means of a fixing part formed by a secondary light guide part 220, this fixing part forming a fixing lug. In other words, the first light guide 201 includes a fixing lug inside which light rays $R_2$ and $R_3$ propagate and is therefore also a light guide part.

The first light guide 201 is adapted to allow propagation of light in this main part 210, for example by internal reflection, from an entry diopter 212 to a main exit diopter 218.

The first light guide 201 is intended to receive light rays $R_1$, $R_2$, $R_3$ from a light source 251. The rays $R_1$, $R_2$ first pass through the entry diopter 212 of the main guide part 210 and thereafter propagate inside a first portion 214, termed the upstream portion, of the main guide part 210. This upstream portion 214 extends from the entry diopter 212 as far as a reflection portion 216 and as far of a junction portion 222 of the main guide part 210 and the fixing part 220.

In line with this upstream portion 214, the main guide part 210 is extended on the downstream side of the reflection portion 216 by a downstream portion 217. The latter terminates in the main exit diopter 218.

This reflection portion 216 enables interception of a second portion of rays $R_2$, $R_3$, the first portion of rays $R_1$ being that which is not intercepted.

The first portion of rays $R_1$ will therefore pass into the main guide part 210, alongside this reflection portion 216, and propagate in the downstream portion 217 as far as the main exit diopter 218.

The light guide 201 is for example such that these light rays $R_1$ constitute the majority of the rays $R_1$ and $R_2$, $R_3$ received by the entry diopter 212 so that the light guide 201 can, alone or in part, produce a light beam for signaling or for lighting the road.

On the other hand, the second portion of rays $R_2$, $R_3$ encounter the reflection portion 16, 116 and are reflected thereby. The reflection portion is adapted to divert these rays $R_2$, $R_3$ toward the junction zone 222 of the two guide parts. They will therefore thereafter enter the fixing part 220, which also forms the secondary guide part. This reflection portion 216 and the secondary guide part 220 are notably such that this second portion of rays $R_2$ thereafter propagates along the secondary guide part 220.

The secondary guide part 220 and therefore the fixing lug of the light guide 201 comprise a fixing portion 229 comprising a fixing means formed in this example by a first stud 227 in which nests a tenon 227' of complementary shape. This tenon 227' is part of the second light guide 201'.

The tenon 227' is also in the form of a stud and includes a central hole aligned with the hole through the first stud 227. A screw 234 passes through the first stud 227 and is screwed into the tenon 227'.

Thus the fixing lug/secondary guide part 220 and therefore the first light guide 201 are fixed into the lighting device 260, the second light guide 201' serving to support the first light guide 201.

The fixing part 220 of this first light guide 201 includes a decoupling portion.

As shown in FIG. 1, the decoupling portion is situated between the fixing portion 229 and the junction zone 222. It comprises on its rear face decoupling means formed in particular by prisms 200. The rays $R_2$, $R_3$ intercepted and reflected by a reflection portion 216 will be diverted toward the junction zone 222, pass through the latter and enter the fixing part 220, thereafter propagating in this decoupling portion by internal reflection at its walls. However, as they progress, some of these rays $R_3$ will encounter decoupling means, notably faces of the prisms 200, adapted to deflect them toward the front face 223 of the decoupling portion at an angle such that they will emerge from the fixing part/secondary guide part 220 through this front face 223.

These prisms 200 are arranged along or over the decoupling portion of the fixing part or secondary guide part 220, for example over the rear face of the decoupling portion of the secondary guide part 220, these prisms in this case reflecting the rays toward the front face 223. Thus the front face 223 of this decoupling portion will radiate over its entire length, or over the entirety of this front face 223, and therefore generate a luminous halo.

This front face 223 of the decoupling portion is concave as seen from the outside, its concave side facing the closure outer lens 264. This will make it possible to generate a luminous halo in the front space 265 of the lighting device 260 situated between the decoupling portion and the closure outer lens 264. This will therefore create diffuse illumination of the optical elements and masks 240, 240' in front of this decoupling portion.

These optical elements and these masks are visible in the daytime through the closure outer lens. According to the embodiments including the decoupling portions, like the example shown, they will also be visible at night. Their shapes could therefore also be used for a night signature.

The second light guide 201' also has a main guide part 210' from which extends a fixing part 220'. This main guide part and this fixing part join in a junction zone 222'.

This fixing part 220' of the second light guide 201' can also form a secondary guide part, as in the case of the first light guide 201. This is the case in the example shown.

An inclined facet 216' faces the junction zone 222' of the second light guide 201' to divert into the secondary guide part 220' a portion of the set of rays $R_1$, arriving from the entry duct 212' of the second light guide 201'. The facet is inclined in the sense that it is at a non-zero angle to the direction in which the main part of the light guide extends.

This fixing part or secondary guide part 220' also comprises on its rear face decoupling means 200' arranged along a decoupling portion between the tenon 227' and the junction zone 222' of the second light guide 201'.

This decoupling portion of the fixing part 220' of the second light guide 201' also has a concave shape facing toward the closure outer lens 264 and also generates a luminous halo of the same type as the one generated by the first light guide 201.

In this embodiment, the first light guide 201 is situated below the second light guide 201' on a vertical axis. The fixing parts or secondary guide parts 220 and 220' extend rearward from the corresponding junction zones 222, 222', curving upward, for the first light guide 201, and rearward, being curved downward, for the second light guide 201'. This will make it possible to generate an upward luminous halo toward the front and a downward luminous halo toward the front. Overall, the whole of the front space 265 will be illuminated. It is even possible to place elements such as masks or optical elements in this front space 265 with a diffusing luminous halo retained around the latter.

To strengthen this aspect, the decoupling portions of these two light guides 201 and 201' are arranged so as together to form a single concavity facing toward the closure outer lens 264.

To conceal the fixing between the stud 227 and the tenon 227' it is possible to place an occulter with an occultation part 230 in front of this stud 227 and this tenon 227'. According to the embodiment shown, this occulter includes a passage 231, such as a hole through it or a notch, through which the tenon 227' is connected to the decoupling portion of the secondary guide part 220' of the second light guide 201'. To the rear of this passage the occulter includes a lug 232 the hole through which has the fixing screw 234 passed through it and gripped between the stud 227 of the first light guide and the head of the screw 234.

Generally speaking, and going beyond the example shown, the fixing lug of the first light guide, the fixing lug of the second light guide and the occulter are fixed in accordance with a linear stack, in particular each comprising an orifice, their orifices having a single fixing means, such as a screw, passed through them.

According to one embodiment, each secondary guide part 220, 220' of these light guides 201, 201' includes a branch 226, 226' between the corresponding decoupling portion and the fixing stud 227 and the fixing tenon 227', respectively. The passage from one of these decoupling portions to the corresponding branch 226, 226' forms a step or edge 225, 225'. The rays $R_2$ guided by the second guide parts 220, 220' as far as these steps 225, 225' or as far as the corresponding branches 226 will be susceptible to leaving the light guide 201, 201'. In the absence of any occulter, there is not only a risk of them leaving in an uncontrolled manner, but also leaving via the edge surface, there is a risk of them creating an unwanted light spot. The occulter described above makes it possible to occult these rays $R_2$.

Figure 4:
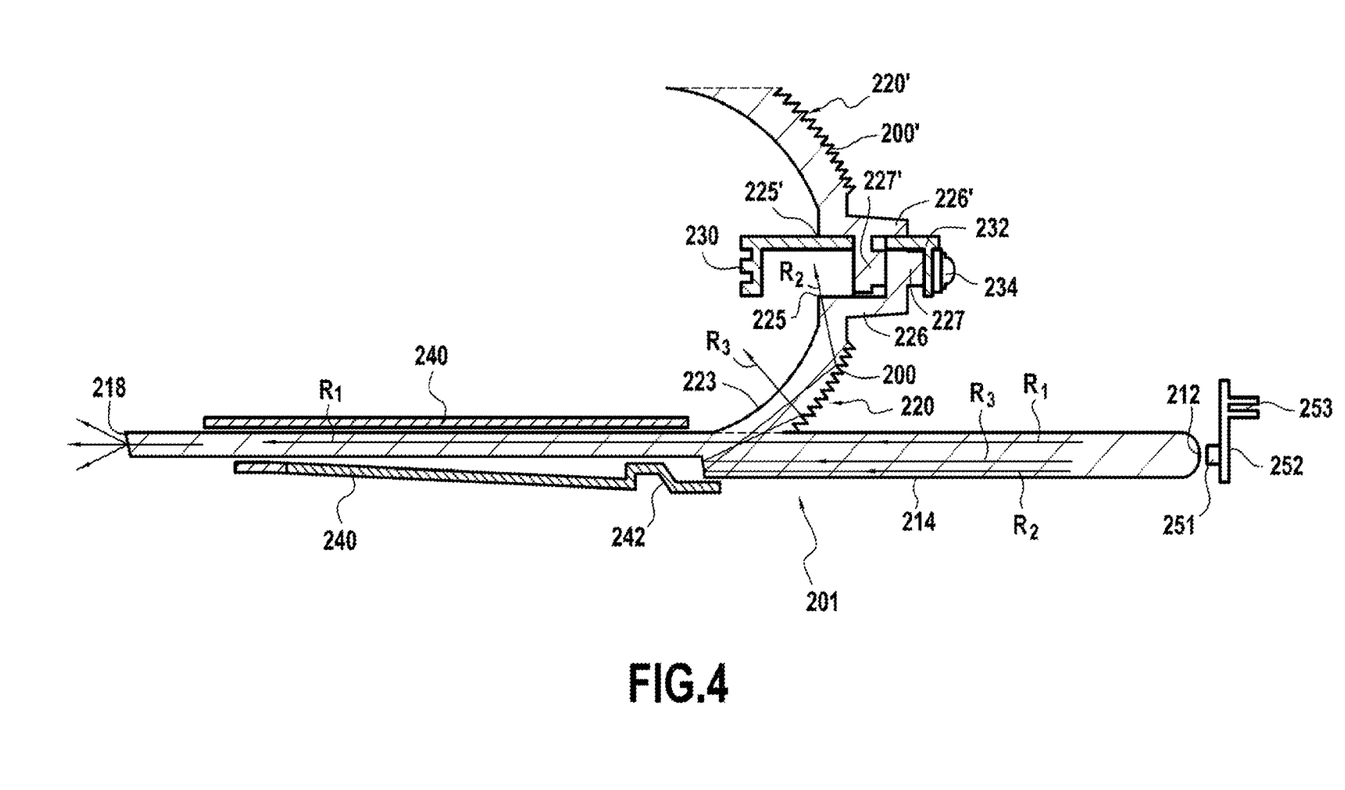
FIG. 4 is a perspective view of a light guide according to a variant embodiment of the junction between the main guide and the secondary guide part shown in FIG. 3.
Figure 5:
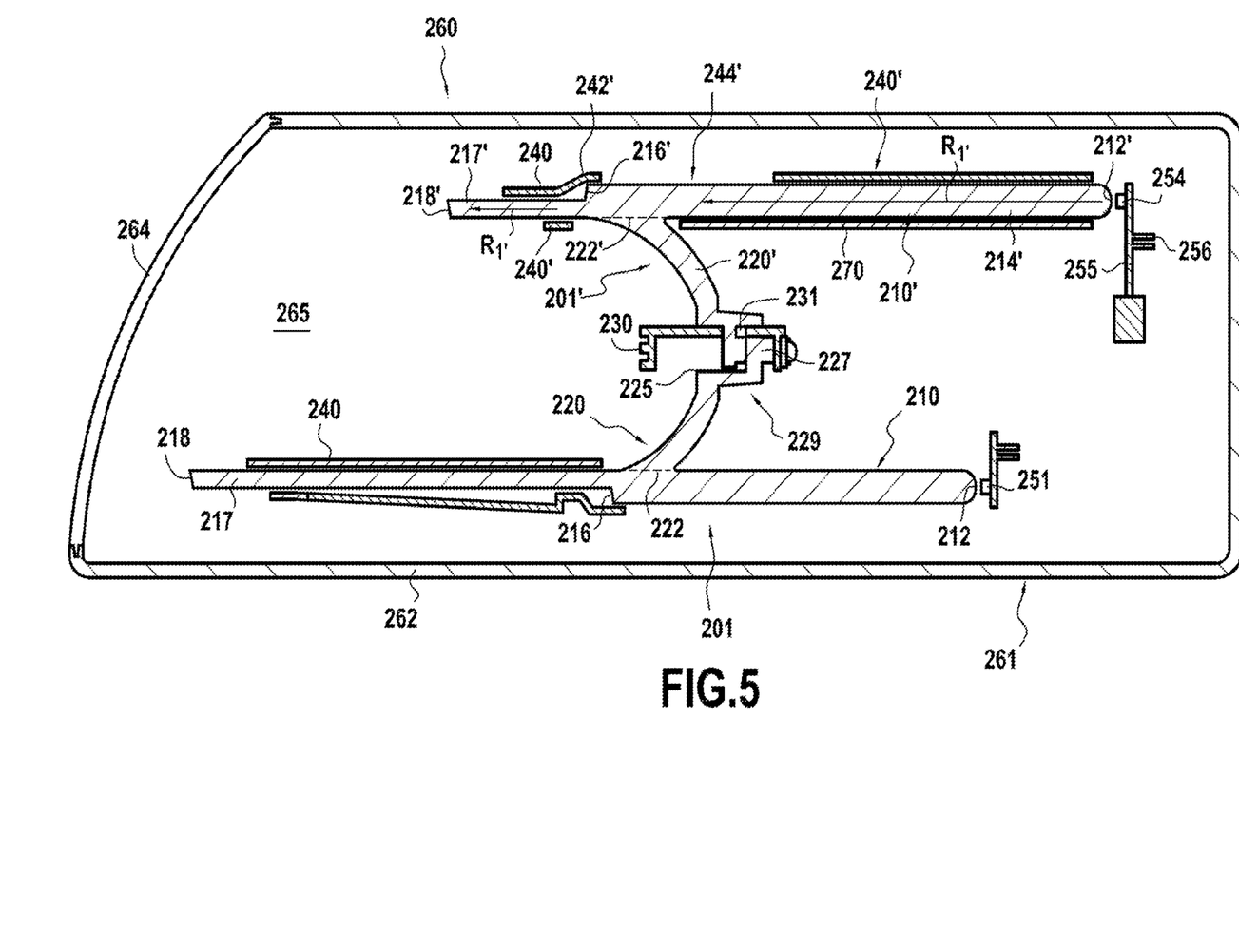
FIG. 5 shows a longitudinal section of the light guides from FIG. 4 or 5.

In particular, in the arrangement shown in FIGS. 4 and 5, the occultation part 230 has a vertical face and a horizontal face making it possible to occult the unwanted rays.

In the embodiment shown in FIGS. 1 and 2, the majority of the light rays entering the light guides 201 and 201' leave via their exit diopters 218 and 218' situated at the end of their downstream portions 217, 217'. In this example, the latter will allow the generation of a signaling light beam, in particular make it possible to comply with the distribution and luminous intensity, also termed the photometry, of a signaling beam, notably a stop light, or a stop light for the first guide 201 and a reversing light for the second guide 201'.

As in the example shown, the invention enables arrangement of the light guides 201 and 201' so that their main guide parts 210 and 210' are parallel or the overall emission directions of their light beams through their exit diopters 218 and 218' are parallel. This is particularly useful when the beams from these main parts contribute to signaling functions and especially useful if they together provide the same signaling function.

These exit diopters 218 and 218' can also include frosting for dispersing the light rays around the overall emission direction of the beam and therefore widen the latter.

For esthetic reasons, the downstream portions 217, 217' of the main guide parts 210, 210' are covered by a mask 240, 240'. The latter is in the form of a sleeve placed over the corresponding downstream portion 227, 227'.

This mask includes a step 242, 242' adapted to abut against the constriction forming the reflection portion 216, 216'. In this example, the reflection portions 216, 216' being inclined facets, the steps 242, 242' of the masks are also inclined facets. This makes it possible to create a limit for the interengagement of these masks 240, 240' and to position them. In FIG. 5, only the mask 240' of the second light guide 201' extends as far as the end.

The downstream portions 227, 227' project from these sleeves. This is not necessary provided that their light beams can exit from them but is simpler to implement.

The sides of these masks 240, 240' oriented toward the center of the front space 265, namely in this example the upper side of the mask 240 of the first light guide 201 and the lower side of the mask 240' of the second light guide 201', can be lit by the luminous halo. To reinforce the diffuse effect of the halo, it is possible to make these sides diffusing or reflective, for example by aluminizing them.

According to one embodiment, the mask 240' of the second guide comprises a part, an upper part in this embodiment, that also covers the upstream portion 214' of the main guide part 210'. This mask 240' covers only the upper face of the upstream portion 214' and not the opposite face, here the lower face, of the upstream portion 214' to enable easy threading of this mask 240' onto the downstream portion of the second guide 201'. It is however possible to attach an additional mask 270 to mask this opposite face.

The mask 240' can comprise an opening 244' and the upstream portion 214' can comprise decoupling means such as prisms and/or striations (not shown) facing this opening 244'. These decoupling means are adapted to decouple another portion of the light rays guided in the upstream portion 214' of the main guide part 210' so that they exit via this opening 244'. An additional luminous halo will therefore be created in the envelope 261 of the vehicle lighting device 260.

In the example shown in FIG. 5, this additional luminous halo radiates between the second light guide 201' and the upper wall of the casing 262.

The light sources can be light-emitting diodes (LED) 251, 254. They are arranged facing the entry diopters 212, 212' of the light guides 201 and 201'. They are carried by electronic circuit cards 252, 255 notably connected to an electrical power supply via connectors 253, 256.

The entry diopters 212, 212' can be such as to reduce the aperture angle of the beam of light rays passing through them. For example, they can form a collimator. For example, they can have parabolic portions with a focus that passes through the photo-emissive element of the corresponding LED 251, 254.

FIGS. 1 and 2 show an embodiment of the junction between the main part and the secondary part of a light guide 1, 101, 201 and 201' of the lighting device shown in FIGS. 4 and 5. They also make it possible to show the overall shape of the light guides of the lighting device according to the invention.

As described above, each of the light guides of the lighting device according to the invention comprises a main light guide part 10, 110 and a fixing part 20, 120 joining in a junction zone 22, 122. The shape of the sections of these light guides along a longitudinal axis going from their entry diopter 12, 112 to their main exit diopter 18, 118 is similar and is shown in FIG. 3.

Figure 3:
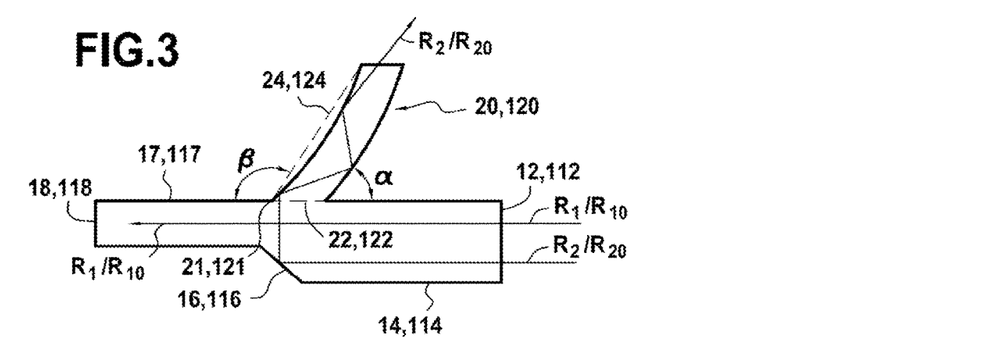
FIG. 3 is a perspective view of a detail of a light guide according to one embodiment applied in the device of the invention, notably the junction between the main guide part and the secondary guide part.

The fixing part of the light guide 20, 120 forms a secondary light guide part (the fixing is not shown in FIGS. 1 to 3).

The FIG. 1 light guide is a light guide formed of plates, i.e. its main guide part 10 comprises a plane upstream portion 14 and a downstream portion 17. The upstream portion 14 and the downstream portion 17 of the main light guide part 10 each comprise two extended faces joined to one another and delimited by a peripheral edge surface. These extended faces can allow the propagation of light in this main part 10, for example by internal reflection, from the entry diopter 12 as far as the main exit diopter 18. These extended faces can be plane, as shown in FIG. 1. The section of these portions in a plane perpendicular to the overall direction of emission of the light beam by the light guide is globally rectangular. Similarly, the secondary guide part 20 is in the form of a plate, notably a curved plate.

The FIG. 2 light guide 101 is a light guide formed of rods, i.e. its main guide part 110 comprises an upstream portion 114 and a downstream portion 117 in the form of rods. The upstream portion 114 and the downstream portion 117 can allow the propagation of light in this main guide part 110, for example by internal reflection, from the entry diopter 112 as far as the main exit diopter 118. The section of these portions in a plane perpendicular to the overall direction of emission of the light beam by the light guide can for example be globally circular or oblong. Similarly, the secondary guide part 120 is in the form of a rod, notably a curved rod.

In these two embodiments shown in FIGS. 1 and 2, the light guides 1 and 101 are intended to receive light rays $R_1$, $R_2$ and $R_{10}$, $R_{20}$ from a light source. These rays $R_1$, $R_2$ and $R_{10}$, $R_{20}$ first pass through an entry diopter 12, 112 of the main guide part 10, 110 and then propagate inside the upstream portion 14, 114 of the main guide part 10, 110. This upstream portion extends from the entry diopter 12, 112 as far as a reflection portion 16, 116 and as far as the junction zone 22, 122 of the two guide parts 10, 110 and 20, 120.

In line with this upstream portion 14, 114 the main guide part 10, 110 is extended downstream of the reflection portion 16, 116 by the downstream portion 17, 117. The latter terminates in the main exit diopter 18, 118.

The reflection portion 16, 116 is formed by an inclined facet forming a constriction of the main guide part 10, 110. As can be seen in FIG. 3, the thickness of the downstream portion 17, 117 is therefore less than that of the upstream portion 14, 114.

This constriction is an embodiment enabling interception of a second portion of rays $R_2$, $R_{20}$, the first portion of rays $R_1$, $R_{10}$ being that which is not intercepted.

On encountering the reflection portion 16, 116 formed by the constriction the second portion of rays $R_2$, $R_{20}$ will be reflected by the latter into the secondary guide part 220 and then propagate along the latter.

Note that at the level of the junction zone 22, 122, and downstream thereof, the surfaces of the main guide part 10, 110 and the secondary guide part, which is also a fixing part of the light guide 20, 120, join along a downstream edge 21, 121. There is a risk that the rays impacting on this downstream edge and the immediately surrounding area may have an angle of incidence such that they exit the light guide 1, 101.

To reduce this risk, the light guide 1, 101 can have a particular arrangement. As can be seen in FIGS. 1 to 3, the secondary guide part, which is also a fixing part of the light guide 20, 120, extends from the junction zone 22, 122 and then rearwards. The extension of the secondary guide part 20, 120 from the main guide part 10, 110 therefore starts from this junction zone 22, 122, being rearwardly oriented where it starts.

When observed from the outside and from the rear of the guide 1, 101 the secondary guide part 20, 120 therefore forms with the upstream portion 14, 114 of the main guide part 10, 110 an acute angle $\alpha$ (i.e. an angle less than 90°).

On the other hand, when observed from the outside of the guide 1, 101 and from the front thereof the secondary guide part, which is also a fixing part of the light guide 20, 120, forms with the downstream portion 17, 117 of the main guide part 10, 110 an obtuse angle (i.e. an angle greater than 90°. For example, when the secondary guide part 20, 120 is curved, as in these examples, it forms a curve the chord 24, 124 of which is at an obtuse angle $\beta$ to said downstream portion 17, 117 as seen from the outside of the guide.

This reduces the risk of leakage of some light rays and makes it possible to increase the chances of them being reoriented in the secondary guide part 20, 120.

This also enables some rays $R_1$, $R_{10}$ passing alongside the reflection portion 16, 116 and that would impact on the zone at the level of the downstream edge 21, 121 to be less liable to exit the light guide 1, 101 and to continue to propagate in the main guide part 10, 110 along the downstream portion 17, 117.

Moreover, this arrangement enables rearward return of the light rays with the same light guide and without decoupling the rays therefrom (i.e. without them leaving it).

Note that the secondary guide part 20, 120 can be such as to use in different ways the rays $R_2$, $R_{20}$ that it guides. For example, it can be such that all or a portion of these rays $R_2$, $R_{20}$ propagate as far as the end 28 of the secondary guide part opposite the junction zone 22, 122 and leave it, notably to contribute to a signaling and/or road lighting function. It can alternatively or additionally comprise on its rear and/or front surface decoupling means adapted to allow the rays impacting on them to exit the guide. If these decoupling means are arranged along the secondary guide part, which is also a fixing part of the light guide 20, 120, they allow the rays to exit over all of its rear and/or front surface.

The invention claimed is:

1. A vehicle lighting device comprising:
    a first light guide and a second light guide each adapted to emit at least a part of a lighting function, said two guides being two separate parts,
    said first light guide comprising:
    a first main light guide part comprising a first entry portion configured to receive light rays from a first light source and a first main exit portion, wherein a portion of light rays passing through the first entry portion are guided to the first main exit portion, and
    a first fixing part extending from a side of the first main light guide part,
    said second light guide comprising:
    a second main light guide part comprising a second entry portion configured to receive light rays from a second light source and a second main exit portion, wherein a portion of light rays passing through the second entry portion are guided to the second main exit portion, and
    a second fixing part extending from a side of the second main light guide part,
    wherein said first fixing part is nested with said second fixing part between said first main light guide part and the second main light guide part.

2. A vehicle lighting device according to claim 1, wherein the first fixing part is made in one piece with the first main light guide part.

3. The vehicle lighting device according to claim 2, wherein the second fixing part is made in one piece with the second main light guide part.

4. The vehicle lighting device according to claim 1, wherein the first fixing part is fixed in contact with the second fixing part.

5. The vehicle lighting device according to claim 4, wherein the fixing part of one of the first and second light guides comprises a receiving lug or stud, and the fixing part of the other one of the first and second light guides comprises a tenon or a stud adapted to nest in said receiving lug or stud.

6. The vehicle lighting device according to claim 5, wherein a fixing rod passes through both said receiving lug or said receiving stud and said tenon or said stud adapted to be nested.

7. The vehicle lighting device according to claim 1, wherein:
    at least one of the first and second fixing parts forms a secondary light guide part, and
    a second portion of the light rays passing through the entry portion of the corresponding light guide part is guided through the secondary light guide part to the corresponding fixing part, the corresponding fixing part comprising decoupling means arranged along a decoupling portion of said corresponding fixing part so that a part of the second portion of light rays escape along the decoupling portion.

8. The lighting device according to claim 7, wherein at least one of the first and second fixing parts comprises a fixing means for fixing the corresponding fixing part, said at least one of the first and second fixing parts forming at least one step between the decoupling portion and the fixing means of the same light guide.

9. The vehicle lighting device according to claim 8, wherein an occulter is positioned in front of the fixing means of at least one of said first and second light guides so as to occult light rays exiting from said fixing means.

10. The vehicle lighting device according to claim 1, comprising said first and second light sources being adapted to emit light rays through a respective one of said first and second entry portions.

11. The vehicle lighting device according to claim 1, wherein said first and second light sources are light-emitting diodes.

12. The vehicle lighting device according to claim 1, wherein light rays exiting the main exit portions of said first and second light guides form all or part of at least one of a signaling lighting function, a road lighting function, a stop light, a turn indicator and a reversing light function.

13. The vehicle lighting device according to claim 1, wherein at least one of the first and second entry portions comprises an entry diopter and at least one of the first and second main exit portions comprises a main exit diopter.

14. The vehicle lighting device according to claim 2, comprising said first and second light sources adapted to emit light rays through a respective one of said first and second entry portions.

15. The vehicle lighting device according to claim 1, wherein the fixing part of one light guide comprises a receiving lug or stud, and the fixing part of the other light guide comprises a tenon or a stud adapted to nest in said receiving lug or stud.

16. The vehicle lighting device according to claim 15, comprising:
one of a fixing rod and a screw fixing together one of said receiving lug and stud and one of the tenon or stud adapted to nest.

17. The vehicle lighting device according to claim 1, comprising:
one of a fixing rod and a screw fixing together said first and second fixing parts.

18. The vehicle lighting device according to claim 1, comprising:
a secondary light guide part connected to said first main light guide part at a first junction portion and connected to the first fixing part at a second junction portion,
a decoupling portion formed in the secondary light guide part to divert light rays passing through the secondary light guide,
a step formed in the secondary light guide part between the decoupling portion and the second junction portion, and
a light blocking member configured to block light rays exiting the secondary light guide at the step.

19. The vehicle lighting device according to claim 1, comprising:
a light blocking member configured to block light rays exiting the first and second fixing parts.

20. The vehicle lighting device according to claim 1, wherein one of the first and second light guides supports the other one in said lighting device.

* * * * *